(12) United States Patent
Stokes

(10) Patent No.: US 10,764,250 B2
(45) Date of Patent: Sep. 1, 2020

(54) METHOD AND SYSTEM FOR FIRST PARTY AND THIRD PARTY DETECTION AND FOR THE OCCLUSION OF NETWORK DEVICE TLS SIGNATURES

(71) Applicant: WINSTON PRIVACY, Chicago, IL (US)

(72) Inventor: Richard Stokes, Glenview, IL (US)

(73) Assignee: WINSTON PRIVACY, Chicago, IL (US)

( * ) Notice: Subject to any disclaimer, the term of this patent is extended or adjusted under 35 U.S.C. 154(b) by 0 days.

(21) Appl. No.: 16/573,381

(22) Filed: Sep. 17, 2019

(65) Prior Publication Data
US 2020/0092258 A1 Mar. 19, 2020

Related U.S. Application Data

(60) Provisional application No. 62/732,211, filed on Sep. 17, 2018.

(51) Int. Cl.
*H04L 29/06* (2006.01)
*H04L 9/06* (2006.01)
*H04L 9/32* (2006.01)

(52) U.S. Cl.
CPC ........ *H04L 63/0245* (2013.01); *H04L 9/0643* (2013.01); *H04L 9/3247* (2013.01); *H04L 63/166* (2013.01)

(58) Field of Classification Search
CPC .. G06F 16/9566; H04L 47/70; H04L 61/1511; H04L 63/101; H04L 63/168; H04L 61/35; H04L 63/0236
See application file for complete search history.

(56) References Cited

U.S. PATENT DOCUMENTS 5,311,596 A 5/1994 Scott et al.
5,404,403 A 4/1995 Bright et al.
(Continued)

OTHER PUBLICATIONS

Valenta et al., "In search of CurveSwap: Measuring elliptic curve implementations in the wild," Published in: 2018 IEEE European Symposium on Security and Privacy (EuroS&P), Apr. 24-26, 2018 <URL: https://ieeexplore.ieee.org/abstract/document/8406612>. (15 pages).

(Continued)

*Primary Examiner* — Olugbenga O Idowu
(74) *Attorney, Agent, or Firm* — Buchanan Ingersoll & Rooney PC

(57) ABSTRACT

A method for uniquely identifying a network client or application based on a transport layer security (TLS) handshake includes: storing, in a computing device, a list of cipher suites and a list of supported curves; intercepting, by the computing device, a data packet transmitted to as part of the TLS handshake; filtering, by the computing device, cipher suites included in the list of cipher suites from the data packet; filtering, by the computing device, supported curves included in the list of supported curves from the data packet; building, by the computing device, a data string using data in the data packet remaining after filtering; generating, by the computing device, a signature value by hashing the data string; and identifying, by the computing device, a network client or application using the generated signature value.

16 Claims, 7 Drawing Sheets

(56) References Cited

U.S. PATENT DOCUMENTS

| | | | |
|---|---|---|---|
| 7,436,965 B2 | 10/2008 | Sherman | |
| 8,112,485 B1* | 2/2012 | Cooley | G06Q 10/107 709/206 |
| 2003/0093553 A1 | 5/2003 | Le et al. | |
| 2010/0306525 A1 | 12/2010 | Ferguson | |
| 2010/0318784 A1 | 12/2010 | Rao et al. | |
| 2011/0119487 A1 | 5/2011 | Alexander et al. | |
| 2014/0229601 A1* | 8/2014 | Zhao | H04L 41/50 709/223 |
| 2015/0026341 A1* | 1/2015 | Blacka | H04L 63/168 709/225 |
| 2016/0359823 A1 | 12/2016 | Ayyadevara et al. | |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jan. 3, 2020, by the International Application Division Korean Intellectual Property Office in corresponding International Application No. PCT/US2019/051480. (11 pages).

He et al., "Online Identification of Tor Anonymous Communication Traffic," Journal of Software, (Mar. 2013), vol. 24, No. 3, pp. 540-556.

"Digital Signatures in SSL and TLS," This build: May 25, 2018, Copyright IBM Corporation 1999,2014, This topic's URL: https://www.ibm.com/support/knowledgecenter/SSFKSJ_7.1.0/com.ibm.mq.doc/sy10520_.htm sy10520_ (2 pages).

"Flter: Privacy & Security Router by Flter—Kickstarter," https://www.kickstarter.com/projects/flter/flter-privacy-and-security-router, (22 pages).

Raskin, "Flter uses VPN and Tor over your home network to protect privacy and security," 9to5Toys, (Mar. 29, 2017), https://9to5toys.com/2017/03/29/flter-privacy-and-security-router/ (4 pages).

"Beam: The World's Most Advanced Router," (https://www.indiegogo.com/projects/beamapps-computers#/) (10 pages).

Husák et al., "Network-based HTTPS Client Identification Using SSL/TLS Fingerprinting," Conferences Paper, (Aug. 2015), Institute of Computer Science, Masaryk University, Brno, Czech Republic, pp. 1-8.

Phung et al., "Lightweight Self-Protecting JavaScript," Proceedings of ACM Symposium on Information, Computer and Communications Security (ASIACCS 2009), pp. 47-60.

Kemmerer, "The SSL/TLS Handshake: an Overview—SSL.com," (Mar. 3, 2015), (4 pages).

Third-Party Cookies Vs First-Party Cookies—Opentracker, https://www.opentracker.net/article/third-party-cookies-vs-first-party-cookies, (3 pages).

"TLS Handshake Protocol," Microsoft Docs, (May 30, 2018), https://docs.microsoft.com/en-us/windows/desktop/secauthn/tls-handshake-protocol, (3 pages).

Dierks et al., "RFC 5246—The Transport Layer Security (TLS) Protocol Version 1.2," (Aug. 2008), (105 pages).

\* cited by examiner

METHOD AND SYSTEM FOR FIRST PARTY AND THIRD PARTY DETECTION AND FOR THE OCCLUSION OF NETWORK DEVICE TLS SIGNATURES

FIELD

The present disclosure relates to the detection of computing devices as part of first or third party domains in a computing network, the classification of data requests received in a communication network, and the identification of network clients or applications based on transport layer security handshakes.

BACKGROUND

With the increasing number of computing networks and computing devices, including smart devices, internet of things devices, etc., network security is more important than ever. The average user may be largely unaware of attacks or attempted attacks on their networks and devices, relying completely on built-in protections and monitoring. In many cases, built-in protections may not be enough to prevent malicious attacks or even identify when an attack may be occurring or if there is a potential threat to a network. As a result, users interested in network security must often rely on third party devices and programs.

Common programs utilized by users for network security include antivirus programs and firewalls. In most cases, such programs are installed on an endpoint device in a system, such as a user's desktop computer. However, this can often only provide protection to that device itself, leaving the rest of the network largely unprotected. In some cases, the program may be able to monitor other network traffic and detect attacks, but be powerless to stop an attack from occurring on another device. Thus, a stronger form of protection is to have a router, modem, or other similarly situated device that has a firewall or antivirus program available. In such cases, all incoming and outgoing traffic may be monitored by the program. However, these programs often rely on blacklists, whitelists, and other data sets in order to determine if traffic is safe or suspicious. In many cases, these devices and programs lack the ability to identify the source of communications, where these source devices and programs are located, the domains involved, and other information that may provide for a better assessment of potential threats. Thus, there is a need for a system that can identify such information in order to provide more comprehensive protection for a communication network and the attached devices.

SUMMARY

The present disclosure provides a description of systems and methods for creating first and third party domain lists for incoming data requests, classifying incoming data requests as first or third party requests, acting as an intermediary for incoming data requests, and identifying client devices or applications based on transport layer security (TLS) handshake data. In latter cases, when a data packet is transmitted as part of a TLS handshake, known cipher suites, curves, and points can be filtered out from the data, with the remaining data used to build a data string. The data string, or in some cases a hash thereof, may be used as a unique identifier for the source of the data packet, enabling a network device to accurately identify the source of the data packet. Even in cases where the source may be obscured by the delivery of the packet itself, such as through the use of proxies or virtual private networks, the use of filtering and identification of the proper information from the data packet may enable reliable identification using the methods discussed herein, thereby improving network security.

A method for communicating with a first computing network and a second computing network, the computing device comprising a first memory cache and a second memory cache, includes: receiving, by the computing device from a target client device in the first network, a request for access to a resource in the second computing network; determining, by the computing device, a time of the request, a referring domain of the request, and a destination domain of the request; and responsive to determining, by the computing device, that the destination domain is not included in a list of previously determined first-party domains stored in the first memory cache: classifying the request as a third-party request; responsive to determining that the referring domain of the third-party request is included in a list of previously determined third-party domains, configuring a counter value for the third-party request in the second memory cache based on whether an expiration time associated with the referring domain has expired, wherein the expiration time identifies a time in which the third-party request is removed from the list of previously determined third-party domains; responsive to determining that the referring domain of the third-party request is not included in a list of previously determined third-party domains, adding the third-party request to the list of previously determined third-party domains and setting the counter value for the third-party request in the second memory cache to zero; and adding the referring domain of the third-party request to the list of previously determined first-party domains stored in the first memory cache after determining that the counter value for the third-party request in the second memory cache is greater than a non-zero threshold value.

A method includes: receiving, by a computing device, a request for access to a network resource; determining, by the computing device, a referring domain of the request and a destination domain of the request; classifying the request as a first party request responsive to the destination domain being included in a list of first-party domains; classifying the request as a third party request and configuring a counter value for the third-party request based on whether an expiration time associated with the referring domain has expired; and after the request is classified as a third party request, classifying the request as a first party request responsive to the counter value being greater than a non-zero threshold value.

A method for communicating with a first network and a second network includes: receiving, by the computing device from a target client device in the first network, a request for access to a resource in the second computing network; determining an intended network destination of the request; responsive to determining that the intended network destination of the request is a local gateway computing device of the first network, dropping the request; and responsive to determining that the intended network destination of the request is not the local gateway computing device of the first network: mirroring, by the computing device, the request to the intended network destination on half of the target client device by replacing a cipher suite of the target client device with a cipher suite of the computing device; transmitting, by the computing device, the mirrored request toward the intended network destination; receiving, by the computing device, a response to the mirrored request based on the cipher suite of the computing device; and communicating the response to the target client device based on cipher suite of the target client device.

A method for uniquely identifying a network client or application based on a transport layer security (TLS) handshake includes: storing, in a computing device, a list of cipher suites and a list of supported curves; intercepting, by the computing device, a data packet transmitted to as part of the TLS handshake; filtering, by the computing device, cipher suites included in the list of cipher suites from the data packet; filtering, by the computing device, supported curves included in the list of supported curves from the data packet; building, by the computing device, a data string using data in the data packet remaining after filtering; generating, by the computing device, a signature value by hashing the data string; and identifying, by the computing device, a network client or application using the generated signature value.

A system includes: a first computing network; a second computing network including a resource; and a target client device included in the first computing network; a computing device including a first memory cache and a second memory cache, wherein the computing device receives a request for access to the resource in the second computing network from the target client device, determines a time of the request for access, a referring domain of the request, and a destination domain of the request, determines that the destination domain is not included in a list of previously determined first-party domains stored in the first memory cache, classifies the request for access as a third-party request, if the referring domain of the third-party request is included in a list of previously determined third-party domains, sets a counter value for the third-party request in the second memory cache based on whether an expiration time associated with the referring domain has expired, wherein the expiration time identifies a time in which the third-party request is removed from the list of previously determined third-party domains, if the referring domain of the third-party request is not included in a list of previously determined third-party domains, adds the third-party request to the list of previously determined third-party domains and sets the counter value for the third-party request in the second memory cache to zero, and adds the referring domain of the third-party request to the list of previously determined first-party domains stored in the first memory cache if the counter value for the third-party request in the second memory cache is greater than a non-zero threshold value.

A system for classifying data requests includes: a network resource; and a computing device, wherein the computing device receives a request for access to the network resource, determines a referring domain of the request and a destination domain of the request, and classifies the request as a first party request if the destination domain is included in a list of first-party domains, or classifies the request as a third party request if the destination domain is not included in a list of first-party domains, and if the request is classified as a third party request, the computing device further configures a counter value for the third-party request based on whether an expiration time associated with the referring domain has expired, and classifies the request as a first party request if the counter value is greater than a non-zero threshold value.

A system includes: a first network; a second network including a resource; a target client device included in the first network; and a computing device, wherein the computing device receives, from the target client device in the first network, a request for access to the resource included in the second network, determines an intended network destination of the request, and if the intended network destination of the request is a local gateway computing device in the first network, drops the request, or if the intended network destination of the request is not the local gateway computing device, mirrors the request to the intended network destination on behalf of the target client device by replacing a cipher suite of the target client device with a cipher suite of the computing device, transmits the mirrored request toward the intended network destination, receives a response to the mirrored request based on the cipher suite of the computing device, and communicates the response to the target client device based on a cipher suite of the target client device.

A system for uniquely identifying a network client or application based on a transport layer security (TLS) handshake includes: a computing device; a memory included in the computing device storing a list of cipher suites and a list of supported curves; and a processor of the computing device, wherein the processor intercepts a data packet transmitted to as part of the TLS handshake, filters cipher suites included in the list of cipher suites from the data packet, filters supported curves included in the list of supported curves from the data packet, builds a data string using data in the data packet remaining after filtering, generates a signature value by hashing the data string, and identifies a network client or application using the generated signature value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Browsing Detection and Device Identification

Figure 1:
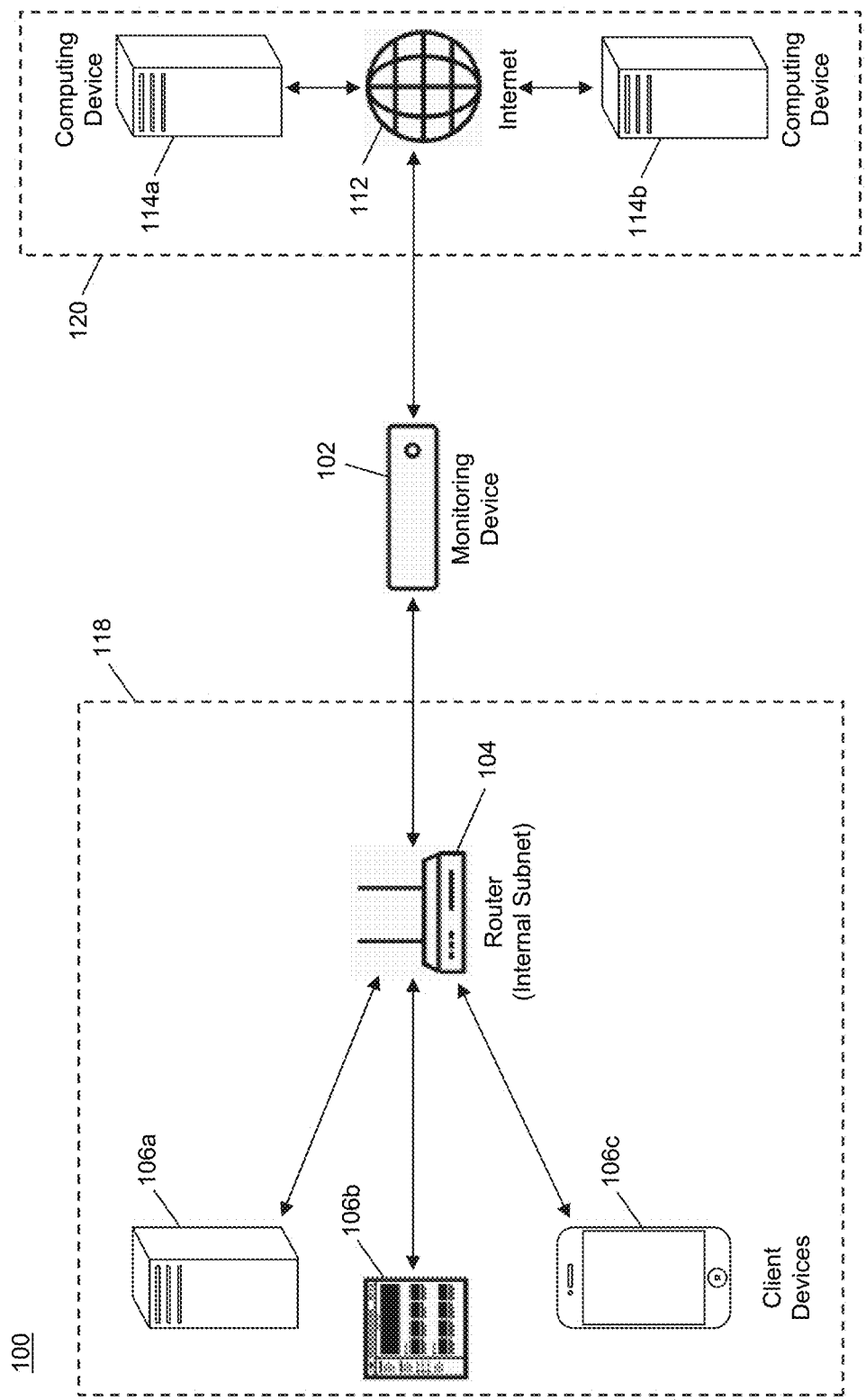
FIG. 1 is a block diagram illustrating high level system architecture for monitoring communication between communication networks and components and identifying communication sources in accordance with exemplary embodiments.

FIG. 1 illustrates a system 100 for monitoring communication between network components for first and third party detection.

The system 100 may include a monitoring device 102. The monitoring device 102, discussed in more detail below, may be a specialized computing device that is specially configured to perform the functions discussed herein for identifying first and third party devices and domains, occluding TLS communications, and identifying source devices and communications based on TLS data packet information. It will be apparent to persons having skill in the relevant art that the monitoring device 102 may be part of another device, such as a router or endpoint device, or may be a standalone device, such as illustrated in FIG. 1.

The system 100 may also include a router 104 or other gateway computing device, and one or more client devices 106. Client devices 106 may be any type of computing device or program executed thereby that is an endpoint for communications in a communication network, such as a desktop computer 106a, web browsing application program 106b, smart phone 106c, or any other suitable type of computing device as discussed herein. The router 104 and client devices 106 may be part of a first network 118. The system 100 may also include a second network 120, which may include a large network of computing devices 114, which may be the Internet 112 or other large network of devices. The computing devices 114 may include web servers, content servers, endpoint devices, routers, etc. The router 104 may be used as a connection between the first network 118 and the second network 120, where the monitoring device 102 inspects and monitors data that passes between the two networks. The monitoring device 102 may be considered to be a part of the first network 118 and/or second network 120 and may, in some cases, be functionality of the router 104 as configured to perform the functions of the monitoring device 102 as discussed herein.

As discussed in more detail below, the monitoring device 102 may be configured to monitor communications from the Internet 112 to the first network 118. Such monitoring may be used to identify first and third parties in the system 100 and the domains and devices associated therewith. The monitoring device 102 may also be configured to occlude network device TLS signatures in the system 100. For instance, the monitoring device 102 may, with permission of a client device 106, intercept communications destined for the client device 106 and may purport itself as the client device 106 for the sake of the TLS communication and act on behalf thereof. The use of monitoring and TLS occlusion may enable the monitoring device 102 to determine if data requests and packets sent to the first network 118 are safe, genuine, and not malicious, and may protect the router 104 and client devices 106 from the receipt of unauthorized data requests and protect the data stored therein and the integrity of the first network 118. The monitoring and classifying of data requests and source computing devices 114 may also enable users of the first network 118, such as a network operator, in determining the health and security of the network and making decisions to allow communications from computing devices 114 and/or second networks 120. As a result, the monitoring device 102 may automatically improve network health and security, as well as providing beneficial tools to users for even greater increases in network security and operations.

A traditional approach for monitoring network traffic includes explicitly marking any requests as first-party which do not contain a referring uniform resource locator (URL). This approach is used by certain browser extensions. While this approach may handle the cases where a user enters a URL directly into their browser or an Internet of things device initiates a request on its own behalf, in the common event that a user clicked a link from a search engine, the destination site would incorrectly be marked as third-party, when in fact the user intended to navigate to that site. The present disclosure differs from such incorrect marking, because the monitoring device 102 does not treat the site as a third-party simply because the request originated from another site, but rather determines the site is a first party based on subsequent behavior, as described herein. Another case in which traditional approaches fails is with certain third-party tracking requests, which intentionally block their own referring URL through the use of nested scripts to avoid detection. The difference is that tracking scripts need to run very quickly and be relatively unnoticeable; therefore the scripts universally load just a few requests (1-3 is common) and thus fail to exceed the threshold. If they were to load many requests, it would introduce noticeable delays. The present disclosure exploits this behavior in selectively filtering these out.

Another traditional approach is to consider as first party any requests in which the two strings match. This approach may identify websites visited via a search engine because those websites may send many requests to their own domain. In an example, a user may click a link on a search engine to navigate to the nytimes.com website. Resources loaded by the New York Times from its own domain (e.g., nytimes.com) are correctly marked as first party while other domains (e.g., jx-sec.indexww.com) are marked as third party. However, this traditional approach would fail to match self-initiated requests via a user's browser or other applications or many requests made from non-standard browsing software (such as IoT devices) because referrer URLs are not provided in such cases. This approach would also fail to identify third-party tracking scripts which call themselves through nested tracking scripts and do not obscure their referring URL. Consider the example in which a tracking script served by indexww.com calls another resource from its own servers. In this case, the traditional implementation fails and the second request is incorrectly marked as first party. This resource will thus be served with a less stringent security policy.

Finally, the traditional approach would incorrectly mark requests made to affiliated resources served from the same root domain third-party websites as third-party, such as content hosting sites or other servers which are commonly used to host videos and other large files because the referring strings do not have an exact match, such as where the string may be from "static.nytimes.com" instead of simply "nytimes.com."

The present disclosure requires a minimal amount of information and incurs minimal computational overhead for all requests, thus making the present disclosure a viable method for environments in which minimizing latency is desirable. This reduction in overhead is due to the utilization of a short-lived burst filter (the second memory cache, discussed below) which maintains a data structure consisting of the domains which have been very recently visited. This conservative data retention policy results in very fast lookups. The present disclosure can also deduce a user's intended web destination and treat resources required by that destination more favorably, while distinguishing them from third-party tracking sources that are called by the same website. These tracking programs can more aggressively filter while preserving the intended functionality of the intended destination site. As an example, the present system may modify the expiration date of a tracking cookie from five years to 24 hours, thus allowing the site to function as intended while mitigating the surveillance potential of the cookie. In contrast, web browsers and other traditional software typically only offer users the ability to block all third-party requests and/or cookies, which frequently breaks intended site functionality.

Consider by way of example that modern browsers allow users to delete or block all third-party cookies. This, however, can have an adverse effect on web browsing due to logging users out of single sign-on services and other content sharing services such as video sites. By correctly distinguishing third-party sites, the present disclosure is able to selectively reduce the expiration time of cookies to a few hours (or even a few minutes), allowing the sites to function correctly while minimizing their ability to track users over longer periods of time. The present disclosure thus effectively eliminates the ability of third parties to make use of any collected user data.

As also discussed below, the monitoring device 102 may be configured to identify client devices and applications by using data included in data packets that are sent as part of a TLS handshake process. In such cases, the monitoring device 102 may intercept data packets, such as CLIENTHELLO packets, that are transmitted to the first network 118 as part of a TLS handshake. The monitoring device 102 may build a data string for the packet that includes version information of the TLS protocol being used, where additional information appended to the data string is data that remains after the use of filters, such as for filtering cipher suites, supported curves, and supported points. Commonly used cipher suites, curves, and points may be filtered using data lists stored in the monitoring device 102, which may be available as part of communication standards, ongoing practices of the monitoring device 102, available from authorized service providers, etc. As data is filtered from the data packet, remaining data may be appended to the data string, where, in some cases, delimiters may be used to separate such additions. In some cases, flags may also be appended to the data string, such as to indicate compression methods, if stapling is used, if TLS tickets are supported, etc.

Once the data string is built, the data string may be hashed, with the resulting hash value being used as a signature value. That signature value may serve as a unique identifier for the source computing device 114 or application program of the CLIENTHELLO packet. This signature value may be used later to identify other packets and communications from the same device, which may simplify and improve the routing and monitoring processes of the monitoring device 102 and thereby improve other functionality of the monitoring device 102 and the first network 118.

Monitoring Device

Figure 2:
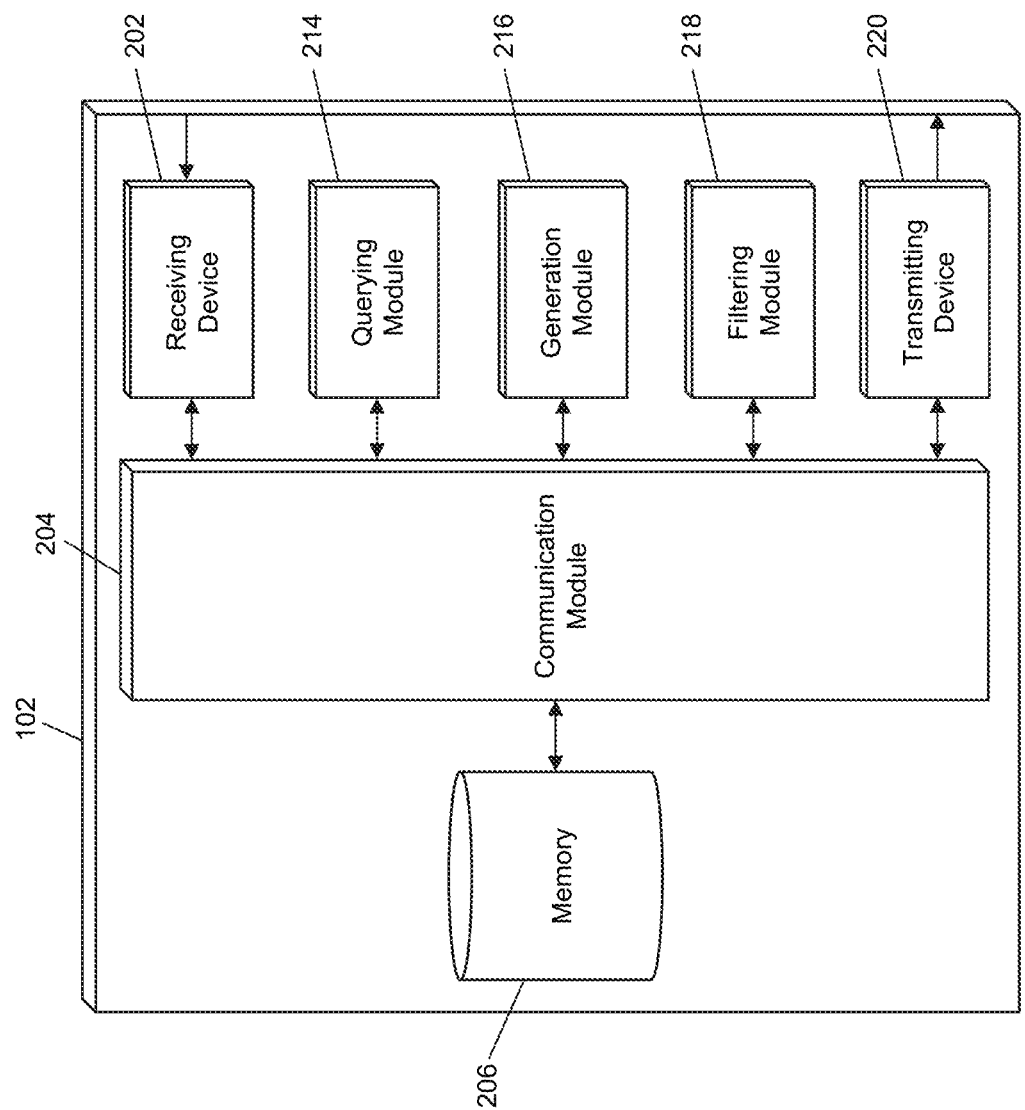
FIG. 2 is a block diagram illustrating the monitoring device of the system of FIG. 1 for monitoring and identifying communications and source devices and applications in accordance with exemplary embodiments.

FIG. 2 illustrates an embodiment of the monitoring device 102 in the system 100. It will be apparent to persons having skill in the relevant art that the embodiment of the monitoring device 102 illustrated in FIG. 2 is provided as illustration only and may not be exhaustive to all possible configurations of the monitoring device 102 suitable for performing the functions as discussed herein. For example, the computer system 700 illustrated in FIG. 7 and discussed in more detail below may be a suitable configuration of the monitoring device 102. In some cases, routers 104, client devices 106, computing devices 114, or other devices may be configured to have the components of the monitoring device 102 as illustrated in FIG. 2 and discussed below, such as in instances where such a device may also perform the functions of the monitoring device 102. For example, a router 104 may be configured to also serve as a monitoring device 102 for the first network 118.

The monitoring device 102 may include a receiving device 202. The receiving device 202 may be configured to receive data over one or more networks via one or more network protocols. In some instances, the receiving device 202 may be configured to receive data from computing devices 102, processing server 104, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 114, routers 104, client devices 106, and other devices that are being transmitted to or from the first network 118. Such data signals may be superimposed or otherwise encoded with any types of data, such as TLS data packets, data requests, etc., and may originate from first or third party domains and devices. The receiving device 202 may also be configured to receive data signals that are superimposed or otherwise encoded with updated filtering lists, such as may be provided by a user (e.g., via an input device) or from a backend server, such as may be used to provide updated data, firmware, etc., for the monitoring device 102. The receiving device 202 may also be configured to receive data requests destined for or transmitted by a client device 106, such as the web browsing application program 106b. For instance, a request for a website or other resource (e.g., hypertext markup language, cascading style sheets, images, scripts, etc.) may be received by the receiving device 202 from the client device 106, where, in return, the receiving device 202 may receive the requested resources from a web server. Such resources may include tracking images and other information, such as internet protocol addresses, browser information, cookies, referring resource locators, etc.

The monitoring device 102 may also include a communication module 204. The communication module 204 may be configured to transmit data between modules, engines, databases, memories, and other components of the monitoring device 102 for use in performing the functions discussed herein. The communication module 204 may be comprised of one or more communication types and utilizes various communication methods for communications within a computing device. For example, the communication module 204 may be comprised of a bus, contact pin connectors, wires, etc. In some embodiments, the communication module 204 may also be configured to communicate between internal components of the monitoring device 102 and external components of the monitoring device 102, such as externally connected databases, display devices, input devices, etc. The monitoring device 102 may also include a processing device. The processing device may be configured to perform the functions of the monitoring device 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, filtering module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The monitoring device 102 may also include a memory 206. The memory 206 may be configured to store data for use by the monitoring device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the monitoring device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may be configured to store filtering data for use in filtering information from data packets received as part of TLS handshakes. Filtering data may include lists of cipher suites, supported curves, supported points, and other data that may be filtered out of a data packet for inclusion of remaining data in a data string built for device and application identification. The memory 206 may also store domain lists and counters related thereto, as well as other information for use in domain sorting and classification, as discussed below. The memory 206 may also be configured to store data based on transmissions to and from client devices 106 in the first network 118. For instance, the memory 206 may store collections of personally identifiable information and web activity, which may be collected and stored by various commercial entities for the purpose of de-anonymizing individuals, constructing personal profiles including their web activity, demographics, psychographics and behavior, and enabling the end users' browsing history to be reconstructed (partially or entirety). This data collection and profiling may occur without the end users' knowledge or explicit consent. The information may be used commercially against the user, such as by charging higher prices to certain users with higher ability to pay, affecting credit scores, influencing insurance underwriting, etc., which can have the potential to cause societal or legal harm (such as in the case of mass surveillance) or direct harm (such as by hackers and eavesdroppers). In some embodiments, the user may intend to visit certain websites either directly or indirectly via links but is generally unaware that the user may be requesting and providing resources to other websites and entities which may be engaging in tracking and personal profiling. The websites which users knowingly and intentionally visit may be referred to as first parties or first party websites/domains while other websites which the user may not be aware of and are collecting information about their activity are referred to as third parties or third party websites/domains.

The memory 206 may also include one or more memory caches stored therein. For example, a first memory cache may be stored in the memory 206, which may include domains which may have been previously determined to be "First Party" domains. In some embodiments, the first memory cache may be initially empty, which, for example, may make no a priori assumptions about what domains should be considered as first party. Entries in the first memory cache may be set to expire by setting an expiration time equal to the current time plus a predetermined first memory cache time-to-live (TTL). Any entries older than the expiration time may be flushed from the cache. The optimal TTL setting may be a few seconds to several hours or days (or longer, depending on various criteria). According to some aspects, shorter times might not provide much added benefit from a tracking perspective and may end up causing the user to have to login to sites more frequently.

The monitoring device 102 may include a querying module 218. The querying module 218 may be configured to execute queries on databases to identify information. The querying module 218 may receive one or more data values or query strings, and may execute a query string based thereon on an indicated database, such as the memory 206 of the monitoring device 102 to identify information stored therein. The querying module 218 may then output the identified information to an appropriate engine or module of the monitoring device 102 as necessary. The querying module 218 may, for example, execute a query on the memory 206 of the monitoring device 102 to identify filtering lists for use in filtering data from received CLIENTHELLO packets, as discussed below.

The monitoring device 102 may also include a generation module 220. The generation module 220 may be configured to generate data for use by the monitoring device 102 in performing the functions discussed herein. The generation module 220 may receive instructions as input, may generate data based on the instructions, and may output the generated data to one or more modules of the monitoring device 102. For example, the generation module 220 may be configured to generate data strings for use in identifying client devices and application programs. The generation module 220 may also be configured to generate signature values by applying hashing algorithms to generated data strings, such as use of the MD5 hash or other suitable hashing algorithms as will be apparent to persons having skill in the relevant art.

The monitoring device 102 may also include a filtering module 218. The filtering module 218 may be configured to filter data for the monitoring device 102 as discussed herein. The filtering module 218 may receive data for filtering, may filter data from the data as instructed, and may output the resulting data to another module or engine of the monitoring device 102. In some cases, the filtering module 218 may receive data to be used for the filter as input. In other cases, the filtering module 218 may identify such data, such as by requesting that the querying module 214 produce a filtering list from the memory 206. The filtering module 218 may, for example, be configured to filter cipher suites, curves, and points from a CLIENTHELLO packet intercepted from a TLS handshake that is occurring using the first network 118.

The monitoring device 102 may also include a transmitting device 224. The transmitting device 224 may be configured to transmit data over one or more networks via one or more network protocols. In some instances, the transmitting device 224 may be configured to transmit data to computing devices 102, processing servers 104, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to and from the first network 118, such as to client devices 106, to the router 104, to computing devices 114, etc. In some cases, the transmitting device 224 may transmit data signals on behalf of client devices 106, where recipient devices (e.g., computing devices 114) may believe that the data signals originate from the client device 106, via the use of TLS occlusion by the monitoring device 102 as discussed below.

Domain Profiling

Figure 3:
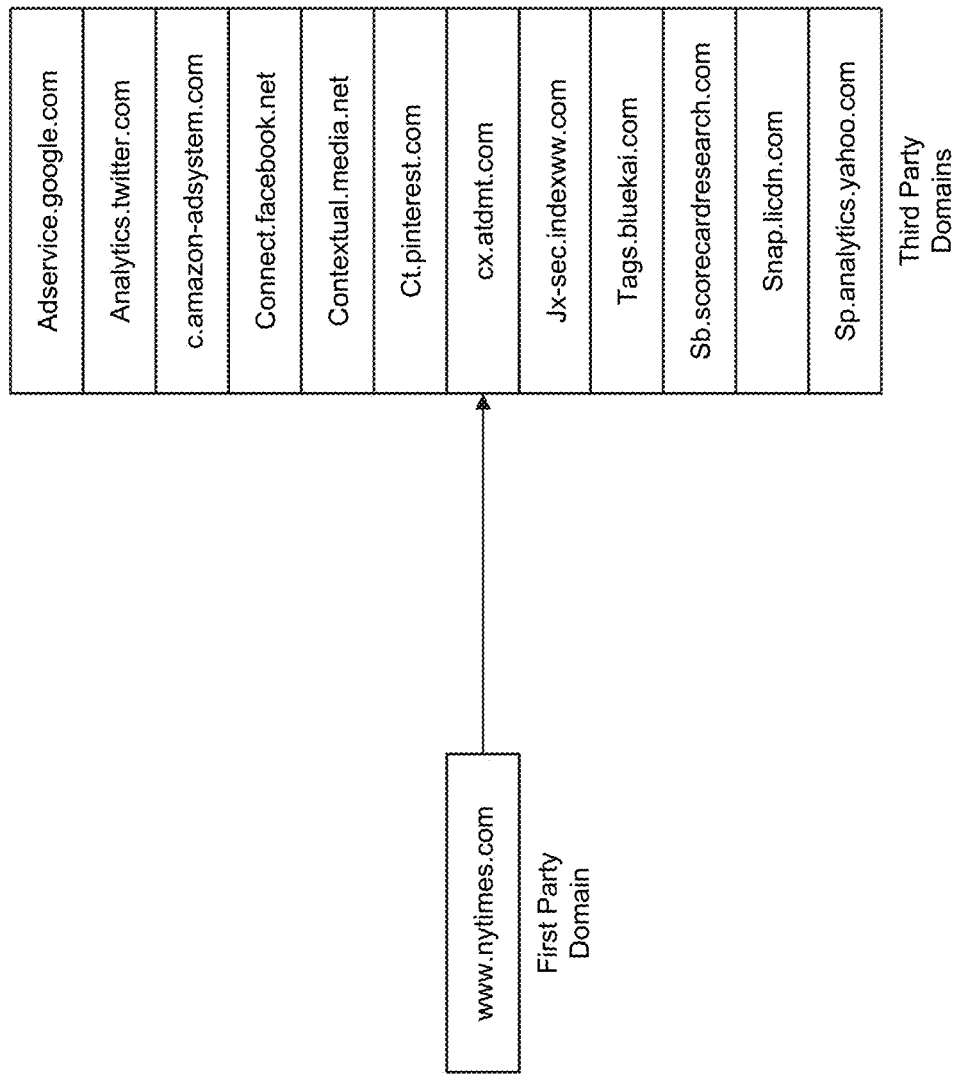
FIG. 3 is a diagram illustrating example relationships between domains in the system of FIG. 1 in accordance with exemplary embodiments.

FIG. 3 illustrates an example of user profiles created by third parties using the monitoring device 102 in the system 100 of FIG. 1.

In this example, the third party domains may be serving tracking resources from the front page of the first party domain www.nytimes.com. A user to the first party domain website may be aware that the user is visiting the New York Times website, but may be unaware that other companies or domains may be tracking the visit to the New York Times website. As a result of this visit, each of these third parties may collect one or more data points of information on the user and/or their client device 106, which may then be used to construct and/or refine an existing profile of that user. Moreover, these individual data points or derivative data sets can be traded or sold to other third parties, effectively resulting in a permanent immutable record distributed across an international ecosystem of tracking companies. These individual data points can be correlated to produce accurate demographic and psychographic profiles on individual users.

As requests are intercepted by the monitoring device 102, the destination domain for a request may be first converted to a different form. This may be achieved by removing any subdomains from the destination domain down to the top-level ICANN-recognized domain suffix, then prepending the suffix with the first subdomain. For instance, "static.nytimes.com" may first be stripped of its leading subdomains "static" and "nytimes" leaving behind the ICANN domain suffix, ".com". The latter subdomain, "nytimes" is then concatenated with the ICANN suffix, resulting in "nytimes.com". Such a process may be used when maintaining the first and third party domain lists, which may be stored in a first memory cache and a second memory cache in the memory 206 of the monitoring device 102, respectively.

In the example illustrated in FIG. 3, two sequences of first party website activity may be reconstructed by a tracking entity (e.g., a third party). For example, a naïve probabilistic analysis may indicate a high confidence that the gender of a first profile is female, while a second profile belongs to a male. More sophisticated machine learning methods can be employed to infer other information about these profiles, such as income, interests, political beliefs, demographics, religion, etc. This information can also be used to influence product pricing, credit scores, insurance underwriting, etc. Commercial efforts in this direction make it likely that individuals may be unknowingly discriminated against and harmed by third parties as a result of visiting certain websites and having this information shared non-consensually throughout an ecosystem of third parties. It is generally known that a software browser extension (or other software installed on a client device 106) may be able to distinguish between first and third party tracking, as described in U.S. Pat. No. 8,166,406, herein incorporated by reference in its entirety. Such software may easily access the intended uniform resource locator from the browser that is also installed on the client device 106, and thus, a correlation between the original first party request and any subsequent requests can be known a priori.

The use of the monitoring device 102 may be able to address the above problems through the use of methods and systems discussed herein, as the monitoring device 102 provides for network monitoring and security outside of client devices 106. Some of the drawbacks with using prior existing software techniques include that it may not be possible, or practical, to install cybersecurity software on a client devices 106. For instance, many smart televisions, digital assistant devices, and other internet of things devices may not allow the user to install software or otherwise modify their behavior in a manner unintended by the original manufacturer. In addition, such devices may often secretly report user behavior to third parties without knowledge or explicit consent of the user, and there may be no way to block such reporting utilizing the inherent capabilities of the device itself.

The present disclosure addresses the drawbacks of the software techniques described above by providing for a correlation to be deduced from a hardware device (e.g., the monitoring device 102) distinct from the target computer. This device can be located either on the same subnet as the users' computer (e.g., a client device 106) or outside of the gateway or router 104 of the client device 106. Furthermore, the current art calls for lists of specific sites to be maintained and checked for each request, which requires additional processing time as the lists of known sites grow longer. In contrast, the present disclosure minimizes the amount of algorithmic overhead and thus is suitable for use in high traffic environments (such as a home network) without introducing noticeable lag or other delays. This advantage is due primarily to the fact that the present disclosure enforces a short-lived data retention policy that does not accumulate large amounts of data from past user web activity.

According to some aspects, the monitoring device 102 can access the stream of network packets emanating from a client device 106 and thus must be logically located between the client device 106 and an external second network 120. One such configuration consists of locating the monitoring device 102 downstream of a router 104 or other upstream device, where it can intercept communications to and from the Internet 112. In some embodiments, multiple subnets and/or routers 104 can be connected to and/or communicate with the monitoring device 102. For example, the monitoring device 102 may include two or more LAN ports (or other modules), where each port can connect to a subnet.

Identification of First and Third Parties

Figure 4:
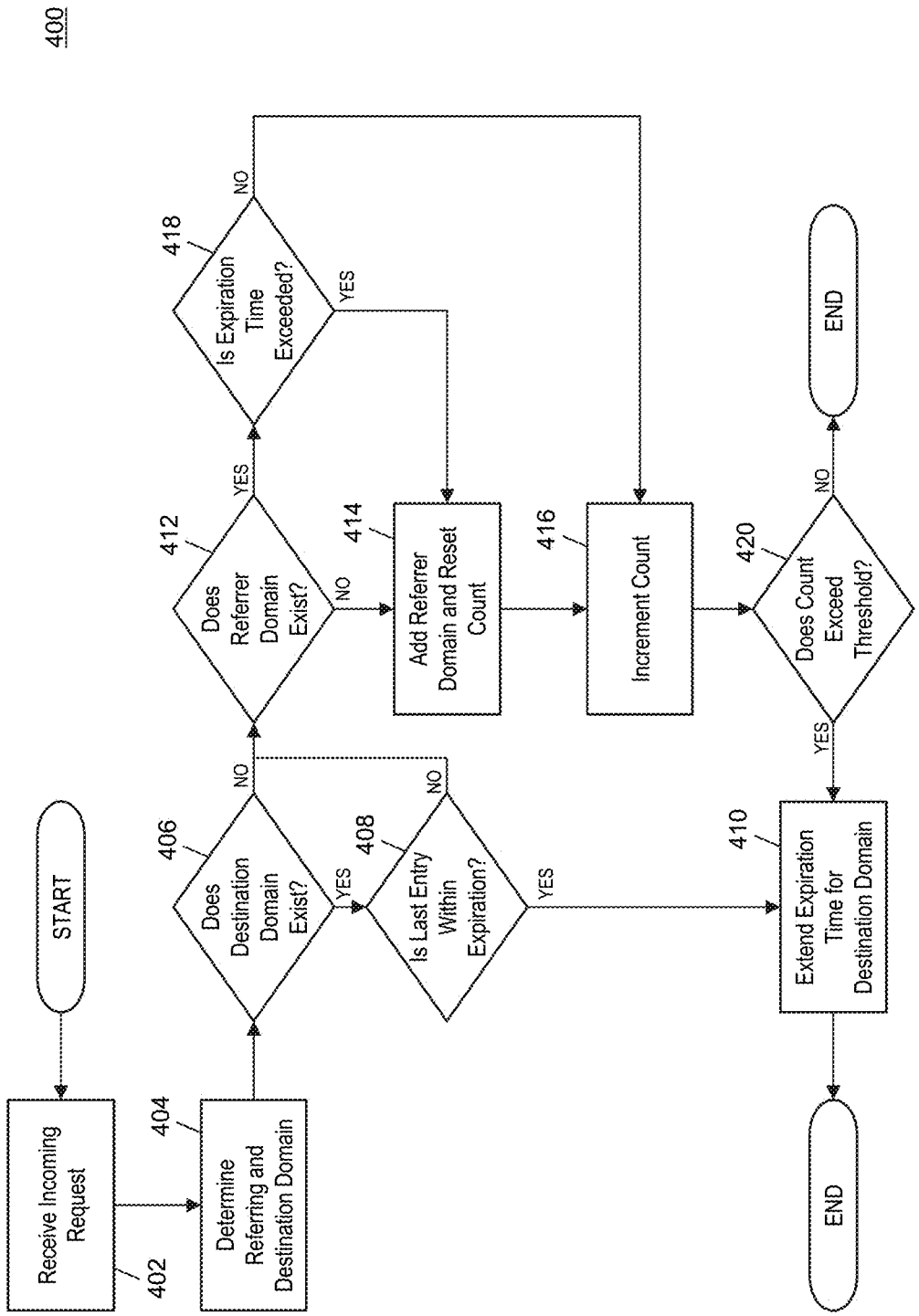
FIG. 4 is a flow chart illustrating a process for identifying first and third parties by the monitoring device of FIG. 2 in the system of FIG. 1 in accordance with exemplary embodiments.

FIG. 4 illustrates a process 400 for the identification of first and third parties in communications destined for the first network 118, as identified by the monitoring device 102 in the system 100. According to some aspects, the present disclosure relates to encrypted communications, such as transport layer security (TLS) communications. In some embodiments, the end user or client device 106 may authorize the monitoring device 102 to act on the user's or client's behalf by installing a trusted root certificate (e.g., one based on the ITU-T X.509 standard) on the target client device 106, which may enable the monitoring device 102 to intercept communications destined thereto.

In step 402, the monitoring device 102 may intercept (e.g., by the receiving device 202) network packets included in a request for a web resource between the first network 118, such as from one or more client devices 106, and the second network 120, such as to the Internet 112 and/or a computing device 114. In step 404, the monitoring device 102 may decrypt the network packets included in the request. The web request may contain minimal information about the source of the request other than a random source port, which may provide no information to determine the originating device or the location of the originating device. For example, the router 104 may include a lookup table used to resolve these random source ports, but the monitoring device 102 may not have access to such data. As such, the monitoring device 102 may have to determine the source of the network packets independently.

In step 406, the monitoring device 102 may determine if the destination domain for the intercepted resource request exists in the first memory cache. In some cases, the monitoring device 102 may first convert the form of the destination domain, as discussed above. The querying module 214 of the monitoring device 102 may execute a query on the first memory cache to determine if the converted domain already exists in the first memory cache. If there is a matching entry, then, in step 408, the monitoring device 102 determines whether an expiration time has been exceeded. If the expiration time has not been exceeded, then, in step 410, the request may be classified as a first party request, and the expiration time for the domain extended (e.g., based on the current expiration time, a predetermined extension time, etc.). The process 400 may then be completed. If, in step 408, the monitoring device 102 determines that the expiration time for the domain has elapsed, then the entry may be deleted from the first memory cache (e.g., by the querying module 214) and the request classified as a third party request and the process 400 moved to step 412.

If the request is classified as a third party request, as a result of either steps 406 (e.g., where the domain is not in the first memory cache) or 408 (e.g., where the expiration time has elapsed), then, in step 412, the monitoring device 102 may identify (e.g., using the querying module 214) if the domain for the request exists in a second memory cache in the memory 206 of the monitoring device 102. If there is no entry for the domain in the second memory cache, then, in step 414, the domain may be added to the second memory cache and a referrer counter value may be set to 0. Then, in step 416, the referrer counter value may be incremented. If, in step 412, the domain already exists in the second memory cache, then, in step 418, the monitoring device 102 may determine if an expiration time for that domain entry has been exceeded. If the time has been exceeded, then the process 400 may proceed to step 414 for resetting of the counter value. If the expiration time has not been exceeded, then the process 400 may proceed to step 416 and the referring counter value incremented.

Once the referrer counter value has been incremented, then, in step 420, the monitoring device 102 may determine if the referrer counter value exceeds a threshold value for the referrer counter, which may be a predetermined value and may vary, such as based on the domain, client device 106, computing device, 114, first network 118, etc. If the counter value does not exceed the threshold, then the process 400 may be completed. If the counter value exceeds the referrer count threshold, then the process 400 may proceed to step 410 where the domain may be stored in the first memory cache and its expiration time extended, as this may indicate sufficient requests to the same domain during a period of time to establish that domain as first party. In some cases, the domain may then be removed from the second memory cache.

Occlusion of Network Device TLS Signatures

Figure 5:
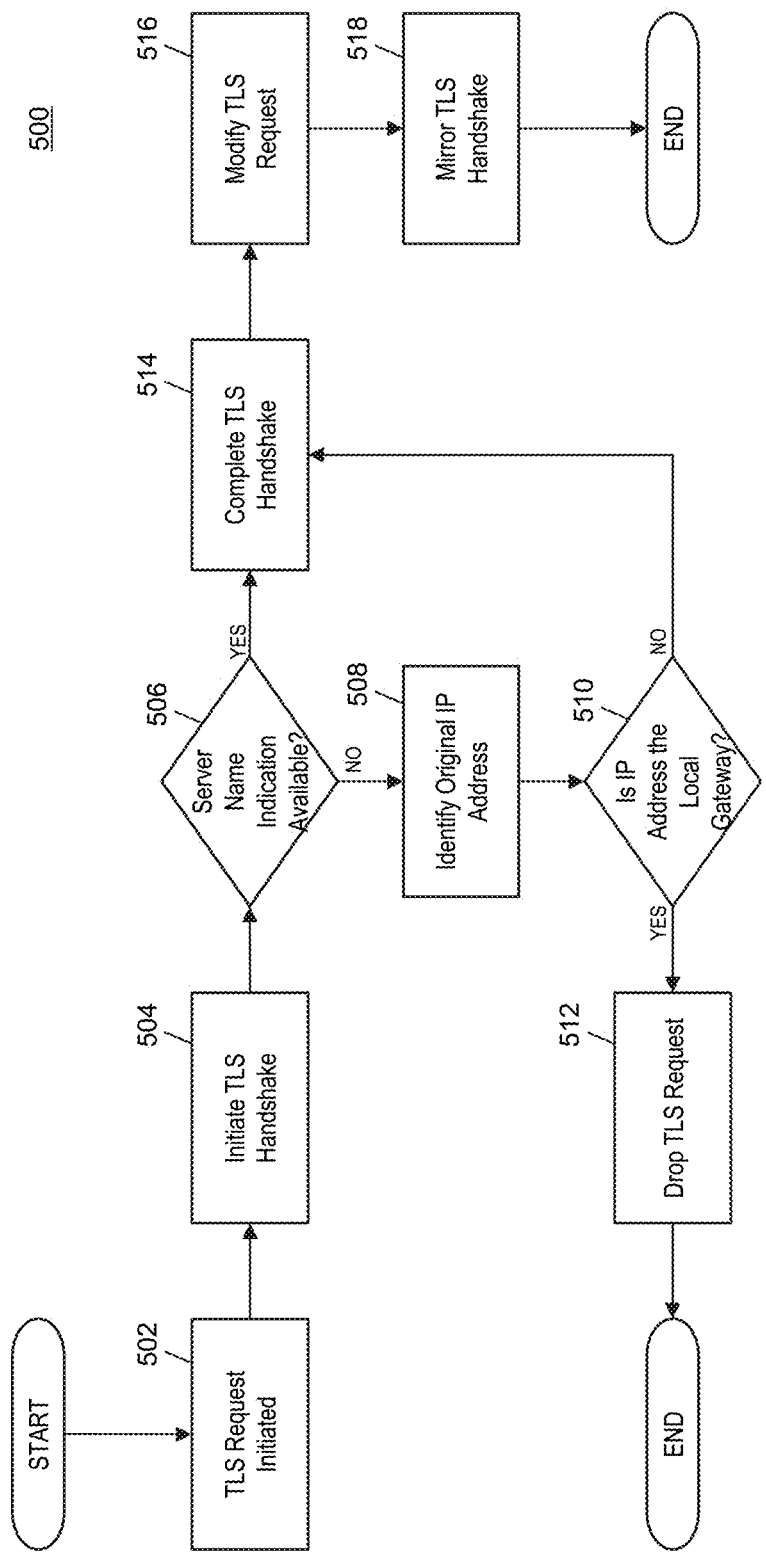
FIG. 5 is a flow chart illustrating a process for the occlusion of network device TLS signatures in the system of FIG. 1 in accordance with exemplary embodiments.

FIG. 5 illustrates an example process 500 for the occlusion of network device TLS signatures in the system 100 illustrated in FIG. 1.

A network router 104 is a device which forwards data packets between computer networks. Most information about the devices on the local area network side of a router 104 is obscured on the wide area network, or exit, side at the network level by design. This allows multiple devices to share a single network address and renders them indistinguishable from one another. This behavior is desirable from a technical perspective, but it also offers cybersecurity advantages as well. For instance, it ideally prevents eavesdroppers who have access to the network of a major corporation from determining information about the computing devices in use by that corporation. In particular, if it were possible to determine that outdated devices or applications were in use on a network, then known security vulnerabilities could be used to gain access to those devices, to the network, and to potentially other devices in the network.

In practice, however, this obscuring property of a router is rendered ineffectual by modern web protocols such as transport layer security (TLS). TLS is a protocol that encrypts web traffic and provides a strong layer of cryptographic security over network communications. However, this protocol emits telltale fingerprints which can be used to identify individual devices and applications running on a network. In particular, the TLS protocol requires callers to identify known cipher suites which a server may choose from to encrypt further communications. A great many cipher suites exist and new ones are constantly being introduced to improve upon older, less secure suites. Devices and applications vary highly in the cipher suites which they support. For instance, two versions of Google® Chrome™ which were released just months apart may recognize different suites. Similarly, Google® products inject a random cipher suite number for debugging purposes which can be used to distinguish Google® products from other vendors, who typically do not do this. The variation of cipher suites alone can allow an attacker to potentially identify individual devices operating on the same network (particularly a small one, such as may be found in the home). The aspects disclosed herein and below address this vulnerability and greatly reduce the attack surface of the TLS protocol, preventing attackers from learning critical details of the devices located behind a router or firewall.

In step 502, an inbound TLS request may be initiated by a client device 106 upstream of the monitoring device 102 in the first network 118. The client device 102 may be connected directly to the monitoring device 102 or indirectly, such as via the router 104 or other gateway device. The request may be redirected from the original destination (e.g., a computing device 114) to a listening port (e.g., the receiving device 202) of the monitoring device 102. This redirection may be handled transparently, such that the client device 106 may be unaware that the client device 106 has not connected directly to the intended destination. For example, the monitoring device 102 may be configured to disguise the monitoring device 102 as the original destination server. The client device 106may be unaware that the client device 106 is not communication with the intended destination, but rather an intermediary (the monitoring device 102) acting on the client's behalf.

In step 504, a TLS handshake may occur between the original client device 106 and the monitoring device 102 acting as if it were the originally intended destination device. In step 506, the monitoring device 102 may determine whether the server name indication extension is available in the request. If the extension is not available, then, in step 508, the monitoring device 102 may identify the original internet protocol address for the originally intended destination, such as by inspecting a CLIENTHELLO message for a server name field, which may indicate the intended destination of the original request. In some embodiments, the monitoring device 102 may inspect networking protocol stack of the monitoring device 102 to determine the original destination IP address of the request. In step 512, the monitoring device 102 may determine whether the original destination IP address is the local gateway of the first network 118 (e.g., the router 104). If so, this indicates a likely attempt by malicious software to probe the capabilities of the current network as a prelude to a cybersecurity attack. In such cases, the process 500 proceeds to step 512, where the TLS request is dropped to prevent such an attack or probe.

If, in step 510, the original destination IP address is determined to not be the local gateway, or the server name indication extension is available, in step 506, then, in step 514, the monitoring device 102 may complete the TLS handshake with the client device 106. In step 516, the monitoring device 102 may modify the TLS request by replacing the client device's cipher suite with a cipher suite belonging to the monitoring device 102. In step 518, the monitoring device 102 may then mirror the original TLS handshake request with the intended destination, with the monitoring device 102 taking the place of the client device 106.

The intention of the above modifications are that all device-specific differences with regards to the TLS protocol are obscured, thus preventing external parties from mining this data and potentially determining what types of devices are present on the network. This method also has the technical advantage that it transparently upgrades clients using outdated and less secure TLS protocols to newer and stronger TLS protocols without requiring installation or modification of software running on those clients. The responses from the destination server may be decrypted using the newly negotiated TLS parameters, then re-encrypted using the client's original TLS parameters. The present disclosure also enables the identification of devices operating on a given network. By recording the cipher suites which clients offer during the initial TLS handshake, the presence of outdated or less secure devices can be established. This information can be used to alert system administrators or network owners, enabling them to upgrade, replace or remove such devices from their networks before they can be compromised by an attacker.

Client Device and Application Identification

Figure 6:
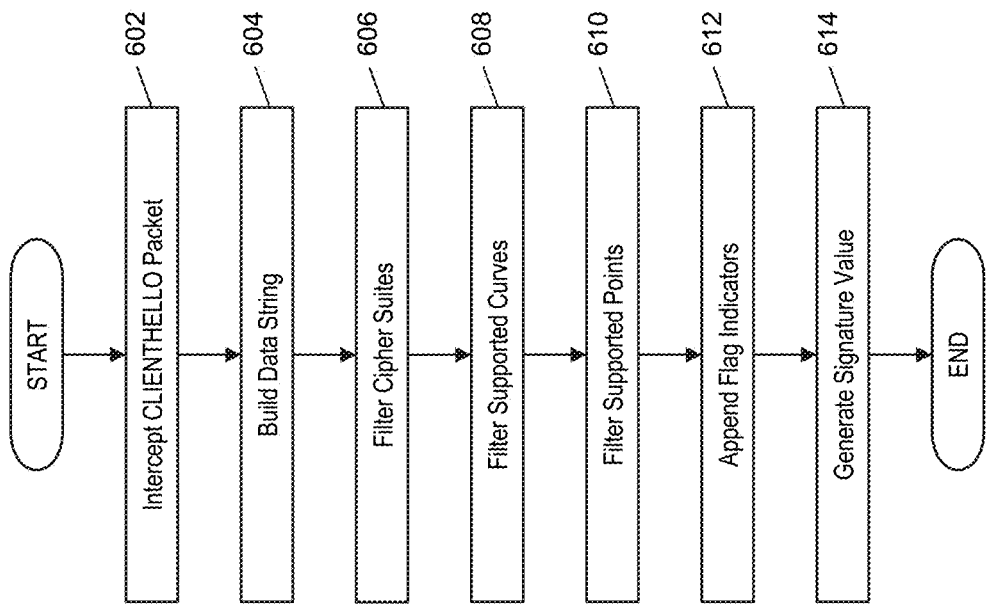
FIG. 6 is a flow chart illustrating a process for identifying a network client or application based on a TLS handshake in accordance with exemplary embodiments.

FIG. 6 illustrates a process 600 for identifying client devices and/or applications in a network through the use of a signature value generated via data identified in a filtered and intercepted TLS data packet.

In step 602, the monitoring device 102 may intercept a CLIENTHELLO packet that is transmitted to or from the first network 118 as part of a standard TLS handshake. In step 604, the generation module 216 of the monitoring device 102 may begin to build a data string, where the data string may begin with a TLS protocol version number. For example, TLS version 1.1 may becoming "11" in the data string, which may then be appended with a delimiter, such as a single dash (e.g., "-"). In step 606, the filtering module 218 of the monitoring device 102 may filter cipher suites from the CLIENTHELLO packet, such as from a filtering data list stored in the memory 206 of the monitoring device 102. The cipher suites in the filtering data list may be based on, for instance, cipher suites identified by a commonly used standard. The monitoring device 102 may filter the cipher suites and then convert and concatenate the remaining cipher suites, which may then be appended to the data string and followed by another delimiter. For instance, in the above example, the data string may become "11-25706682-" after inclusion of cipher suites 2570 and 6682.

In step 608, the filtering module 218 of the monitoring device 102 may again filter the TLS CLIENTHELLO packet for supported curves using a filtering list available to the monitoring device 102. The remaining curves may be again appended to the data string with a delimiter. In the above example, the data string may become "11-25706682-64250-." In step 610, filtering may be performed again by the monitoring device 102 for the filtering of supported points. In cases where there may be no remaining points (e.g., or other values in the above filters), no data may be added to the data string, but the data string may again be appended with the delimiter. For instance, in the above example, if no points remain after filtering, the data string would become "11-25706682-64250--" due to the lack of points and addition of the next delimiter.

In step 612, the monitoring device 102 may continue to add additional data values to the data string with delimiters separating the data values, such as to include flags or other values as a result thereof. For instance, in the above example, data in the TLS packet regarding a compression method, if available, may be included, as well as a flag indicating of OCSP stapling is specified (e.g., where "S1" is used to indicate such a specification and "S0" to indicate no specification), a flag indicating if TLS tickets are supported (e.g., "T1" for support and "T0" for no support), and a flag indicating if Next protocol negotiation is supported (e.g., "N1" for support and "N0" for no support). In the example, the data string may become "11-25706682-64250---S0-T1-N0" if there are no compression methods, OSCP stapling and Next protocol negotiation are not supported, but TLS tickets are supported.

In step 614, the completed data string may be hashed by the generation module 216 of the monitoring device 102. The resulting signature value may be used as a unique identifier, which may be a single alphanumeric value generated via the hashing of the data string. For instance, the above example data string may yield the signature value of "5a4fb0c214b65f77ad91ea7ef67c60d1" if an MD5 hash is used. In some cases, the signature value may be suitable for use as a filename in an operating system, for use by the monitoring device 102.

Computer System Architecture

Figure 7:
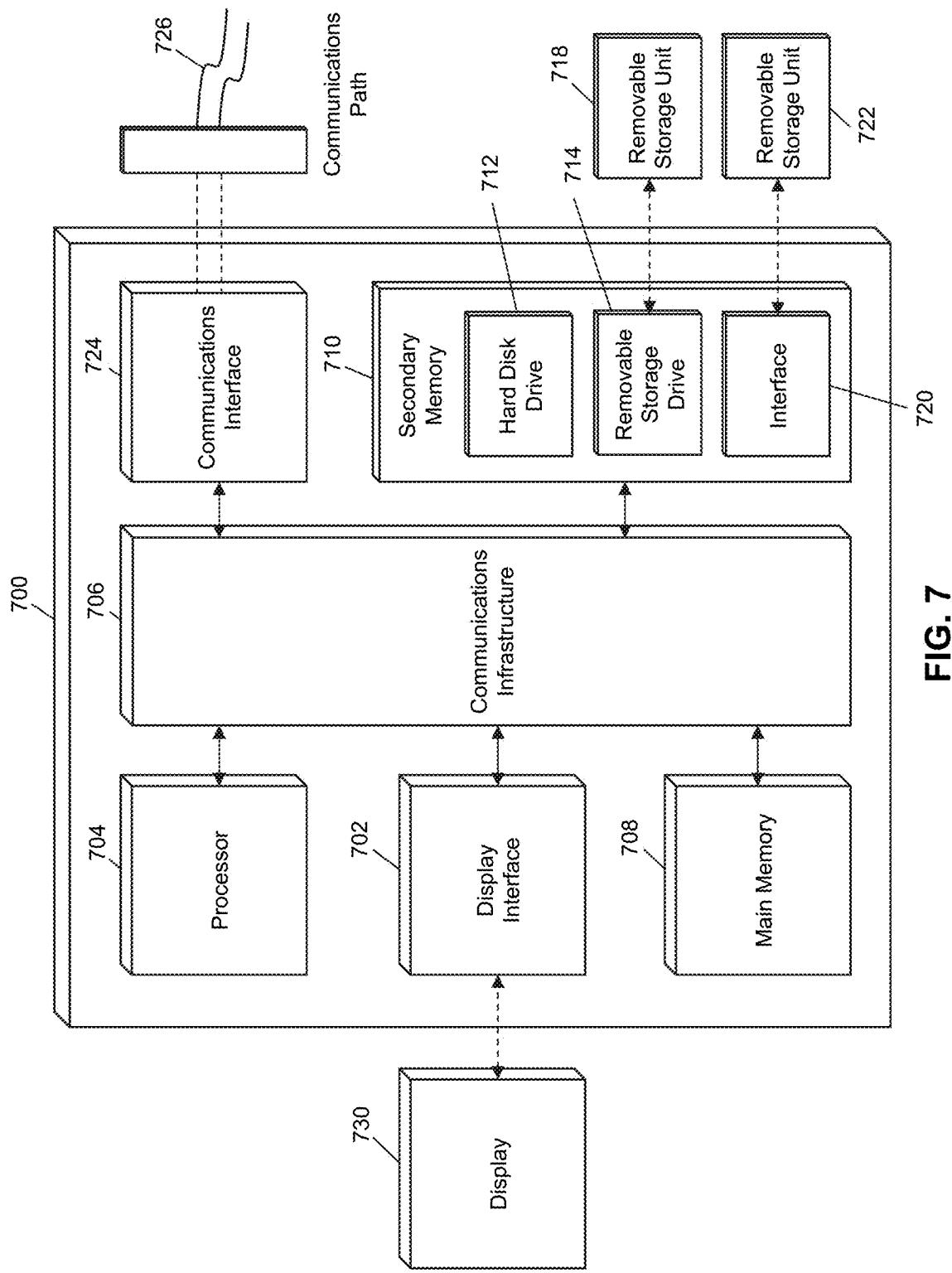
FIG. 7 is a block diagram illustrating computer system architecture in accordance with exemplary embodiments.

FIG. 7 illustrates a computer system 700 in which embodiments of the present disclosure, or portions thereof, may be implemented as computer-readable code. For example, the monitoring device 102, router 104, client devices 106, and computing devices 114 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for unique identifying a network client or application based on a transport layer security handshake. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method performed by computing device configured for communicating with a first computing network and a second computing network, the computing device comprising a first memory cache and a second memory cache, the method comprising:

receiving, by the computing device from a target client device in the first network, a request for access to a resource in the second computing network;

determining, by the computing device, a time of the request, a referring domain of the request, and a destination domain of the request; and responsive to determining, by the computing device, that the destination domain is not included in a list of previously determined first-party domains stored in the first memory cache:

classifying the request as a third-party request;

responsive to determining that the referring domain of the third-party request is included in a list of previously determined third-party domains, configuring a counter value for the third-party request in the second memory cache based on whether an expiration time associated with the referring domain has expired, wherein the expiration time identifies a time in which the third-party request is removed from the list of previously determined third-party domains;

responsive to determining that the referring domain of the third-party request is not included in a list of previously determined third-party domains, adding the third-party request to the list of previously determined third-party domains and setting the counter value for the third-party request in the second memory cache to zero; and adding the referring domain of the third-party request to the list of previously determined first-party domains stored in the first memory cache after determining that the counter value for the third-party request in the second memory cache is greater than a non-zero threshold value.

2. The method of claim 1, further comprising:

responsive to determining, by the computing device, that the destination domain is included in the list of previously determined first-party domains stored in the first memory cache:

classifying the request as the third-party request responsive to expiration of a first memory cache expiration time associated with the destination domain; and extending the first memory cache expiration time associated with the destination domain responsive to non-expiration of the first memory cache expiration time associated with the destination domain.

3. The method of claim 1, wherein entries in the first memory cache are associated with an expiration time, and the added referring domain of the third-party request is associated with a first expiration time.

4. The method of claim 3, wherein the first expiration time indicates a time in which subsequent requests associated with the referring domain are marked first party before the expiration time is reached.

5. A system, comprising:

a first computing network;

a second computing network including a resource; a target client device included in the first computing network; and a computing device including a first memory cache and a second memory cache, wherein the computing device receives a request for access to the resource in the second computing network from the target client device, determines a time of the request for access, a referring domain of the request, and a destination domain of the request, and determines that the destination domain is not included in a list of previously determined first-party domains stored in the first memory cache, classifies the request for access as a third-party request, if the referring domain of the third-party request is included in a list of previously determined third-party domains, sets a counter value for the third-party request in the second memory cache based on whether an expiration time associated with the referring domain has expired, wherein the expiration time identifies a time in which the third-party request is removed from the list of previously determined third-party domains, if the referring domain of the third-party request is not included in a list of previously determined third-party domains, adds the third-party request to the list of previously determined third-party domains and sets the counter value for the third-party request in the second memory cache to zero, and adds the referring domain of the third-party request to the list of previously determined first-party domains stored in the first memory cache if the counter value for the third-party request in the second memory cache is greater than a non-zero threshold value.

6. The system of claim 5, wherein, if the destination domain is included in the list of previously determined first-party domains stored in the first memory cache, the computing device classifies the request as the third-party request responsive to expiration of a first memory cache expiration time associated with the destination domain, and extends the first memory cache expiration time associated with the destination domain responsive to non-expiration of the first memory cache expiration time associated with the destination domain.

7. The system of claim 5, wherein entries in the first memory cache are associated with an expiration time, and the added referring domain of the third-party request is associated with a first expiration time.

8. The system of claim 7, wherein the first expiration time indicates a time in which subsequent requests associated with the referring domain are marked first party before the expiration time is reached.

9. The method of claim 1, wherein configuring the counter value for the third-party request in the second memory cache based on whether an expiration time associated with the referring domain has expired comprises setting the counter value for the third-party request in the second memory cache to zero responsive to expiration of the expiration time associated with the referring domain.

10. The method of claim 1, wherein configuring the counter value for the third-party request in the second memory cache based on whether an expiration time associated with the referring domain has expired comprises incrementing the counter value for the third-party request responsive to non-expiration of the expiration time associated with the referring domain.

11. The system of claim 5, wherein configuring the counter value for the third-party request in the second memory cache based on whether an expiration time associated with the referring domain has expired comprises setting the counter value for the third-party request in the second memory cache to zero responsive to expiration of the expiration time associated with the referring domain.

12. The system of claim 5, wherein configuring the counter value for the third-party request in the second memory cache based on whether an expiration time associated with the referring domain has expired comprises incrementing the counter value for the third-party request responsive to non-expiration of the expiration time associated with the referring domain.

13. The method of claim 1, wherein the computing device is located between the first and second computer networks in communication paths.

14. The method of claim 1, wherein the determining step includes determining, by the computing device, a destination domain of the request based on transport layer security (TLS) handshake data.

15. The system of claim 5, wherein the computing device is located between the first and second computer networks in communication paths.

16. The system of claim 5, wherein the computing device determines a destination domain of the request based on transport layer security (TLS) handshake data.

* * * * *